2,804,385

METHOD OF REFINING PHOSPHORUS CONTAINING PIG IRON

Rudolf F. Graef, Oberhausen, Germany, assignor to Huttenwerk Oberhausen Aktiengesellschaft, Oberhausen, Germany No Drawing. Application November 3, 1954, Serial No. 466,665

Claims priority, application Germany November 9, 1953

5 Claims. (Cl. 75—52)

The present invention relates to the refining of phosphorus containing pig iron and, more specifically, is directed to a method of refining phosphorus containing pig iron by the basic Bessemer process.

It is known that in the basic Bessemer process the dephosphorization of the iron bath is mainly completed without appreciable oxidation of the iron. The removal of the residual phosphorus, however, is accompanied by a considerable combustion of iron. For this reason, it has been the practice to remove the slag as soon as the decarburization period and about one-half of the subsequent dephosphorization period have elapsed, and then to form a new slag, which though rich in iron is poor in phosphoric acid and which is added to the blast furnace after tapping.

In this way, slags of high phosphoric acid content have been obtained, which can be used as a fertilizer for agricultural purposes. Also a certain saving in lime has been obtained, but these slags still contained much iron which was accordingly lost.

It is, therefore, an object of the present invention to provide a method of refining phosphorus containing pig iron in conformity with the basic Bessemer process which will overcome the above mentioned drawbacks.

It is another object of this invention to provide a method of refining phosphorus containing pig iron by the basic Bessemer process which will yield a basic Bessemer slag with a very low iron content.

It is still a further object of this invention to provide a method of refining phosphorus containing pig iron by the basic Bessemer process which will be considerably more economical than heretofore known methods of refining phosphorus containing pig iron and will yield a considerable saving in lime.

These and other objects and advantages of the invention will appear more clearly from the following specification.

The value of a basic Bessemer slag as a fertilizer is determined not only by the phosphoric acid content of the slag but also by the solubility of the phosphoric acid in the soil. The solubility of phosphoric acid in the soil approximates the solubility of phosphoric acid in citric acid, and this can easily be ascertained in the laboratory by "the citric acid test."

According to the process set forth in my co-pending application Ser. No. 360,913, the blast is introduced by nozzles into the metal bath which is in a drum lined with ceramic material and rotating about a horizontal or substantially horizontal axis, said nozzles projecting into the interior of the drum through openings in the end walls of the drum and dipping beneath the surface of the bath through the slag layer.

When practicing this process on an industrial basis, it has been found that a considerable dephosphorization occurs already during the decarburization period, and the phosphoric acid content of the slag rises over the minimum of 16% usually required by agriculture, when the ratio between the lime content in the slag and the phosphorus content in the pig iron charge was selected along the lines set forth further below. It has surprisingly transpired that the citric acid solubility of the phosphoric acid reaches during continuous operation a hitherto unattainable value after a sudden jump which occurs approximately when the carbon content of the pig iron has been reduced to about half its original value. It has furthermore been found that at the point of maximum solubility of the phosphoric acid in the slag as determined by the citric acid test, the iron content of the slag had dropped to below 10%. After drawing off this slag and continuing the refining process with a new slag formed by adding lime in such quantity only which is reduced to about four times the weight of the quantity of phosphorus contained in the subsequent batch of pig iron, a steel could be blown which is poor in nitrogen and has a phosphorus content below 0.04%.

This second slag was retained in the refining drum and used as the first slag during refining of the next batch of pig iron. According to the citric acid test, the solubility of the phosphoric acid of this slag, which was drawn off, when the carbon content had dropped to about half its original value, was nearly 100% in continous operation, while the iron content of this slag was below 8%. This indicates a substantial recovery of the iron contained in the slag as the result of the preceding refining operation. Since with the normal basic Bessemer process, refining of a pig iron of about 1.8% phosphorus content requires about 150 kilograms of lime per ton of pig iron, whereas with the above described process according to the invention only about 75 kilograms of lime per ton of pig iron are required, a saving in lime of about 50% was obtained with the method of this invention.

It has been suggested in connection with the refining of phosphorus containing pig iron according to the basic Bessemer process, to blow the refining means through nozzles into the metal bath contained in a ceramically lined drum rotatable about a substantially horizontal axis, said nozzles extending into the drum through openings in the end walls of the drum and immerging from the top through the slag layer below the surface of the pig iron bath. Making use of this method, according to the present invention, the pig iron is first refined below the slag retained in the refining drum from the preceding melt until the solubility of the phosphoric acid in the slag attains its maximum value according to the citric acid test, whereupon the slag is drawn off, and lime, preferably preheated, is added to the iron bath in a quantity reduced to about four times the weight of the quantity of phosphorus in the next batch of pig iron.

With this process it is easily possible to withdraw the first slag through an opening in the end wall of the drum, e. g. by placing the drum in an inclined position after its rotation has been stopped. It is even possible during this step to continue the blowing and at the end of the refining process to tap off the blown steel e. g. through a periodically opened tap hole, and to retain the final slag in the refining drum.

The withdrawal of the first and the retention of the second or final slag involves difficulties in the basic Bessemer converter, in particular loss of time, and consequently diminished production of the basic Bessemer plant, which have led to abandonment of the first mentioned known process. These difficulties do not however arise in the process according to the invention.

The employment of the process according to the invention in connection with the production of steel yields the following advantages at one and the same time:

1. The production of a slag of high phosphoric acid content and high degree of solubility of the phosphoric acid (as determined by the citric acid test).

2. Considerable reduction in lime consumption as compared with the previously customary refining processes.

3. Low phosphorous content of the steel without addition of special dephosphorizing agents.

4. Substantial recovery of iron contained in the second slag.

5. Utilization of the heat in the second slag.

By appropriately employing the process according to the invention, this process is also suitable for the production of a pre-metal of low silicon and phosphorus content as it is particularly desirable for further treatment of such pre-metal in the open-hearth furnace.

It is, of course, understood that the present invention is, by no means, limited to the particular process described in the preceding description but also comprises any modifications within the scope of the appended claims.

What I claim is:

1. A method of refining phosphorus containing pig iron by the basic Bessemer process in a reaction chamber which is rotatable about a substantially horizontal axis, which includes the steps of: placing the melt to be refined and composed of a pig iron metal bath and a slag obtained as second slag from a preceding refining process into said reaction chamber, introducing a blast into said metal bath below the slag thereon while rotating said reaction chamber, drawing off said slag when the citric-acid solubility of the phosphoric acid in said slag has substantially reached its maximum value, forming a second slag by adding to said bath in said chamber lime in a quantity approximately equaling four times the weight of the phosphorus contained in the next batch of pig iron to be refined for use as first slag with said next batch, and then finishing the refining process in said reaction chamber.

2. A method of refining phosphorus containing pig iron by the basic Bessemer process in a reaction chamber which is rotatable about a substantially horizontal axis, which includes the steps of: placing the melt to be refined and composed of a pig iron metal bath and a slag obtained as second slag from a preceding refining process into said reaction chamber, introducing a blast into said metal bath below the slag thereon while rotating said reaction chamber, drawing off said slag when the carbon content of said iron bath has been reduced to approximately one-half of its original amount, forming a second slag by adding to said bath in said chamber lime in a quantity approximately equaling four times the weight of the phosphorous contained in the next batch of pig iron to be refined for use as first slag with said next batch, and then finishing the refining process in said reaction chamber.

3. A method according to claim 2, in which said lime is added to the metal bath in said chamber in preheated condition.

4. A method of refining phosphorus containing pig iron by the basic Bessemer process in a reaction chamber rotatable about a substantially horizontal axis, which includes the steps of: placing into the reaction chamber the melt to be refined and composed of a pig iron metal bath and a slag obtained as second slag from a preceding refining process, introducing a blast into said metal bath below the slag thereon while rotating said reaction chamber, drawing off said slag when the citric acid solubility of the phosphoric acid in said slag has substantially reached its maximum value, forming a second slag by adding to said bath in said reaction chamber lime in preheated condition in a quantity equaling approximately four times the weight of the phosphorus contained in the next batch of pig iron to be refined, finishing the refining process in said reaction chamber, subsequently drawing off said second slag, and adding the said drawn off slag as first slag to the said next batch of pig iron to be refined.

5. A method of refining phosphorus containing pig iron by the basic Bessemer process in a reaction chamber rotatable about a substantially horizontal axis for subsequent finish-refining, which includes the steps of: placing the melt to be refined and composed of a pig iron metal bath and a basic slag into said reaction chamber, introducing a blast into said metal bath below said slag while rotating said reaction chamber, and stopping the refining process when the carbon content of the pig iron has dropped to approximately one-half its original amount.

References Cited in the file of this patent

UNITED STATES PATENTS

| 2,598,393 | Kalling et al. | May 27, 1952 |

FOREIGN PATENTS

| 493,610 | Great Britain | Oct. 10, 1938 |
| 496,545 | Great Britain | Nov. 28, 1938 |